Aug. 30, 1966  H. B. DENKER ET AL  3,269,243
GUILLOTINE CUTTER FOR ROLL SHEETER
Filed July 9, 1965  3 Sheets-Sheet 1
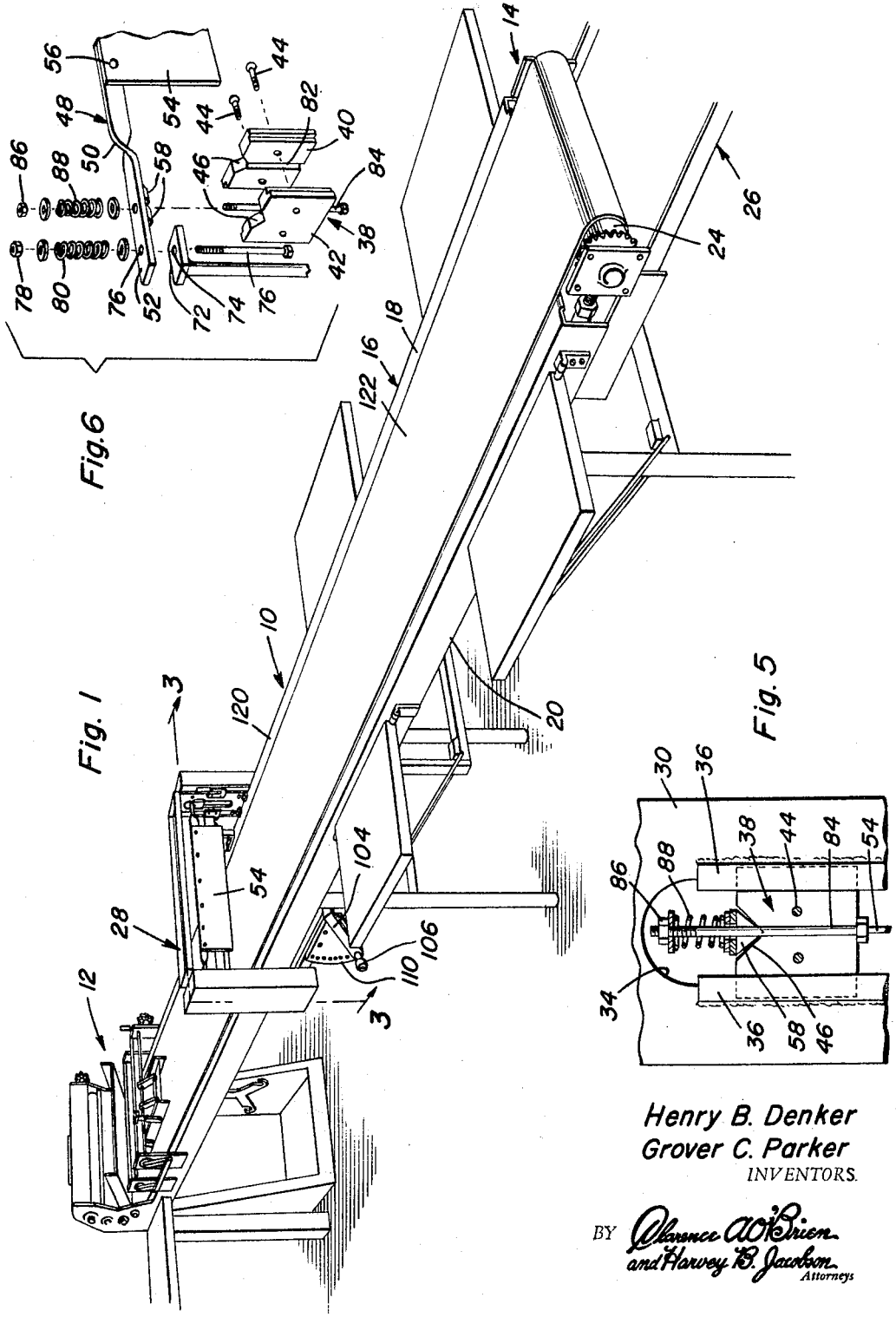
Henry B. Denker
Grover C. Parker
INVENTORS.
BY *Clarence A. O'Brien*
and *Harvey B. Jacobson*
Attorneys Aug. 30, 1966  H. B. DENKER ET AL  3,269,243
GUILLOTINE CUTTER FOR ROLL SHEETER
Filed July 9, 1965  3 Sheets-Sheet 2
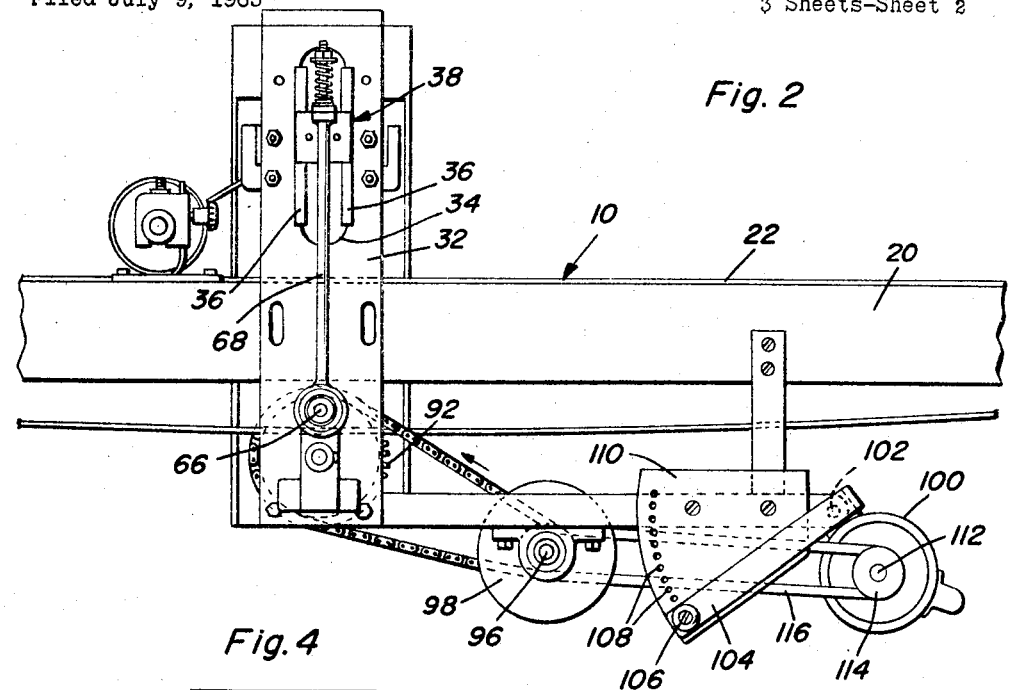
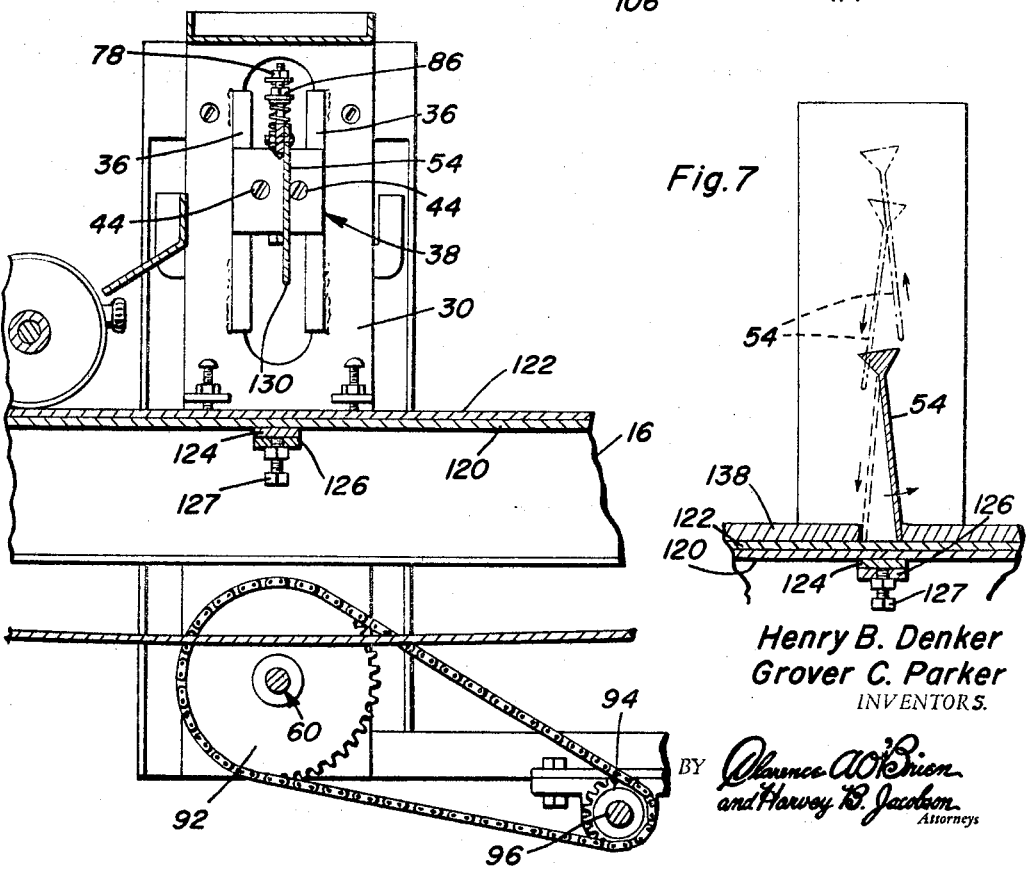
Henry B. Denker
Grover C. Parker
INVENTORS.

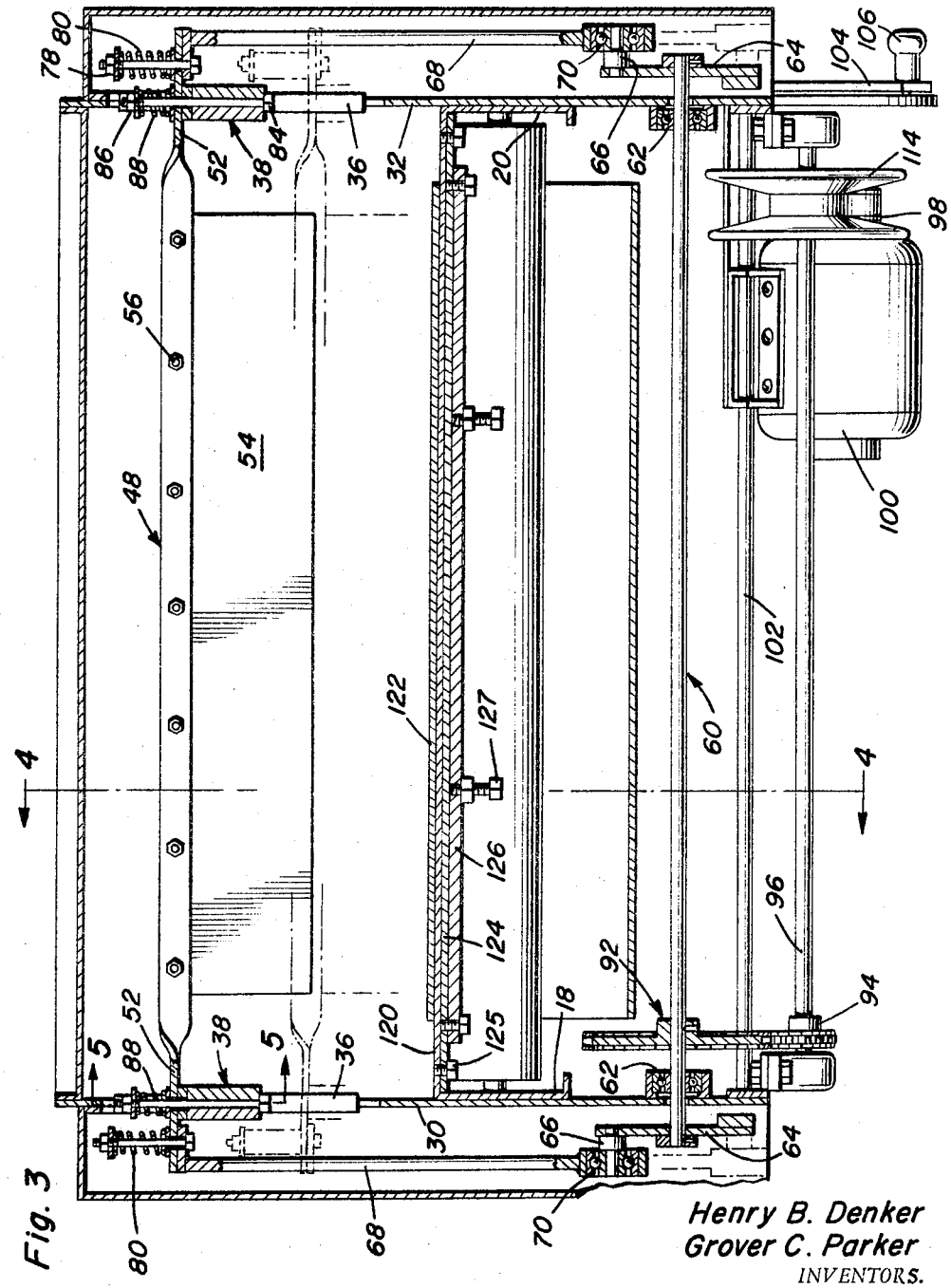

United States Patent Office 3,269,243
Patented August 30, 1966

3,269,243
GUILLOTINE CUTTER FOR ROLL SHEETER
Henry B. Denker, 1961 W. Adams, and Grover C. Parker,
1607 N. 2nd St., both of St. Charles, Mo.
Filed July 9, 1965, Ser. No. 470,733
11 Claims. (Cl. 83—155)

This invention relates to a novel and useful guillotine cutter for roll sheeters and is specifically designed to provide a means whereby dough being conveyed by a conveyor belt may have transverse cuts made therein at points spaced longitudinally therealong.

The guillotine cutter of the instant invention is primarily concerned with providing a means whereby the dough being cut may also be completely separated at each cut.

In the bakery industry machines termed as "roll sheeters" are utilized to form a continuous belt or length of dough in sheet form, of a constant width and thickness, and with the sheet of dough supported on a moving conveyor belt in order that roller-type cutters may be readily utilized to cut the sheet of dough into various shaped individual cut portions.

While roller-type cutters may be utilized in an effective manner to cut a single sheet of dough into a plurality of elongated strips by means of a plurality of spaced side-by-side cutter wheels journaled for rotation about an axis extending transversely of the direction of movement of the sheet of dough to be cut and the sheet of dough may also be scored or at least partially cut into individual adjacent cut portions of predetermined size and shape by means of a roller-type cutter or indenter also journaled for rotation about an axis extending transversely of the direction of movement of the sheet of dough to be cut, a problem exists in providing a means whereby a continous sheet of dough of the forementioned type may be cut into longitudinally spaced individual sheets during movement of the sheet of dough which is to be cut.

Roller-type cutters provided with transversely extending knife edges have been used in an attempt to successfully completely sever a continuous sheet of dough into longitudinally spaced individual sheets or pieces, but these roller-type cutters, inasmuch as their peripheral speed is the same as the linear speed of the sheet of dough being cut, are not capable of completely separating the longitudinally spaced individual cut pieces and instead only indent the sheet of dough which is to be cut with the result that the individual pieces or sections of the dough are not completely separated from each other.

It is accordingly the main object of this invention to provide a cutter for roll sheeters specifically designed to form transverse cuts in sheet dough being conveyed by the roll sheeter in a manner such that the individual cut pieces of dough are completely separated from each other.

In order to carry out the above main object of the invention a guillotine-type cutter blade is mounted for vertical movement above the conveyor belt of the roll sheeter and supported for oscillation between two upper and lower limit positions, the blade being disposed in contact with the belt when in its lower position and being supported by sliding followers slidably engaging vertical guides and reciprocated between the two limit positions by means of a connecting rod operatively connected thereto and to a driven crankshaft journaled for rotation about an axis extending transversely of the conveyor belt. However, such mounting of a guillotine-type cutter blade would not perform the desired function of completely separating the individual cut portions of the sheet of dough to be cut and accordingly, means is provided whereby as the cutter blade reaches its lowermost position and cuts through the dough into engagement with the conveyor belt the lower cutting edge of the blade is "kicked" forwardly so as to push the rear edge portion of the cut dough section disposed immediately forwardly of the blade forwardly away from the front end of the uncut portion of the sheet of dough. In this manner, complete separation of the individual cut portions of the sheet of dough is achieved.

It is a still further object of this invention to provide a novel means for supporting the upstanding guillotine-type cutter blade in a manner such that it is oscillatable between two positions inclined relative to each other about a horizontal axis extending transversely of the associated conveyor belt and spaced appreciably above the lower cutting edge of the blade.

Yet another object of this invention is to provide a novel drive means and connection therefor to the cutter blade whereby operation of the drive means to vertically oscillate the blade will automatically effect oscillation of the blade about the aforementioned horizontal axis of oscillation of the blade.

Still another object of this invention is to provide novel drive means for the guillotine cutter in the form of a constant speed drive input assembly and including means by which oscillation of the guillotine-type cutter blade may be varied while maintaining the speed of the drive input constant.

Another and ancillary object of this invention is to provide a guillotine-type cutter in accordance with the preceding objects and including adjustable means for backing the portion of the associated conveyor belt with which the guillotine cutter blade is engageable whereby the lower cutting edge of the cutter blade may substantially parallel the upper surface of the conveyor belt against which the blade is to be engaged during cutting operations of the sheet of dough supported on the belt.

A final object of this invention to be specifically enumerated herein is to provide a guillotine cutter for a roll sheeter in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a conventional form of roll sheeter shown with the guillotine cutter of the instant invention operatively associated therewith;

FIGURE 2 is an enlarged fragmentary side elevational view of that portion of the roll sheeter from which the guillotine cutter is supported;

FIGURE 3 is a fragmentary enlarged transverse vertical sectional view taken substantially upon the plane indicated by the section line 3—3 of FIGURE 1;

FIGURE 4 is a fragmentary longitudinal vertical sectional view taken substantially upon the plane indicated by the section line 4—4 of FIGURE 3;

FIGURE 5 is a fragmentary longitudinal vertical sectional view taken substantially upon the plane indicated by the section line 5—5 of FIGURE 3;

FIGURE 6 is a fragmentary exploded perspective view of a portion of the guillotine cutter showing the manner in which the cutter blade thereof is supported for vertical oscillation and limited oscillation about a horizontal axis extending transversely of the roll sheeter; and FIGURE 7 is a fragmentary longitudinal vertical sectional view similar to that of FIGURE 4 but with portions of the guillotine cutter diagramamtically illustrated and the various positions of the guillotine cutter blade caused by the vertical oscillation thereof as well as the oscillation of the blade about a horizontal transverse axis being diagrammatically illustrated in solid and phantom lines and showing the manner in which the individual cut pieces or portions of the sheet of dough are wholly separated from the uncut portion of the sheet of dough.

Referring now more specifically to the drawings, the numeral 10 generally designates a conventional form of roll sheeter including an input end generally referred to by the reference numeral 12 and an output end generally referred to by the reference numeral 14. The roll sheeter 10 includes a conveyor assembly generally referred to by the reference numeral 16 having a pair of opposite side members 18 and 20 suitably interconnected and a continuous flexible conveyor belt 22 entrained thereon by means of a discharge end roller 24 and a corresponding inlet end roller (not shown) journaled between the opposite side members 18 and 20.

If it is desired, an additional conveyor assembly generally referred to by the reference numeral 26 may have its inlet end operatively associated with the outlet or discharge end 14 of the roll sheeter 10.

The guillotine cutter assembly of the instant invention is generally referred to by the reference numeral 28 and includes a pair of upstanding opposite side support members 30 and 32 secured to the opposite side members 18 and 20 in any convenient manner. From FIGURE 5 of the drawings it may be seen that each of the side support members 30 and 32 has an upstanding opening 34 formed therein and that a pair of anti-friction guide members 36 are secured in each of the openings 34.

Two fibre follower block assemblies 38 are provided and are slidably engaged with the corresponding pair of guide members 36. Each follower block assembly includes a pair of half sections 40 and 42 which are secured together by means of fasteners 44 and which embrace the corresponding guide members 36. The half sections 40 and 42 include a pair of upwardly opening V-shaped notches 46 and each pair of notches defines an upwardly opening recess.

A guillotine blade assembly generally referred to by the reference numeral 48 is provided and includes an upper horizontal support arm 50 including horizontally disposed opposite end portions 52. The center portion of the support arm 50 has the upper edge portion of a depending panel-like knife blade 54 secured thereto in any convenient manner such as by fasteners 56 and each end portion 52 of the arm 50 includes a pair of V-shaped projections or abutments 58 which are seatingly received in the corresponding notches 46. The included angle formed by the inclined sides of the recesses formed by the notches 46 is approximately 90° and the included angle formed by the inclined sides of the projections 58 is approximately 75°. Accordingly, it may be seen that the knife blade 54 may be oscillated between oppositely inclined positions such as those two uppermost positions indicated in phantom lines in FIGURE 7 of the drawings.

A crankshaft assembly generally referred to by the reference numeral 60 is journaled between the lower ends of the support members 30 and 32 by means of suitable bearings 62 and each end of the crankshaft assembly includes a counterbalanced crank arm 64 provided with a crankpin 66 on which the lower end of a corresponding connecting rod 68 is suitably journaled by means of a bearing 70. The upper ends of the connecting rods 68 include apertured laterally directed end portions 72 whose apertures 74 are registrable with corresponding apertures 76 formed in the corresponding end portion 52 of the support arm 50. A long retaining bolt 76 is secured through each pair of apertures 74 and 76 and retained therethrough by means of a threaded nut 78 with a compression spring 80 disposed between each nut 78 and the upper surface of the support arm 50. In addition, the half sections 40 and 42 are provided with opposing grooves 82 which define an upstanding bore extending through each block assembly 38 and a long retaining bolt 84 is secured through the upstanding bore in each block assembly 38 and the corresponding end portion 52 of the support arm 50 by means of a threaded bolt 86, a compression spring 88 being disposed about each bolt 84 and between the corresponding bolt 86 and end portion 52 of the support arm 50.

The crankshaft assembly 60 has an input sprocket wheel 92 mounted thereon for rotation therewith and the sprocket wheel 92 is driven from a smaller sprocket wheel 94 mounted on a jack-shaft 96 also journaled between the support members 30 and 32, the end of the jackshaft 96 remote from the sprocket wheel 94 having a variable diameter V-belt pulley 98 mounted thereon.

An electric drive motor 100 is swingably supported from the side member 20 by means of a pivot shaft 102 and is retainable in selected adjusted pivoted positions by means of a sector arm 104 mounted for rotation therewith and including a stop pin 106 removably engageable in a selected aperture of the plurality of apertures 108 formed in a sector plate 110. The electric motor 100 includes an output shaft 112 on which there is mounted a pulley 114 of conventional design and an endless flexible belt 116 is entrained about the pulley 114 and the pulley 98. As the output shaft 112 of the motor 100 is swung away from the jackshaft 96, the tension of the belt 116 causes the variable diameter pulley 98 to be reduced in its effective diameter and to therefore vary the drive ratio between the output shaft 112 and the jackshaft 96.

The conveyor assembly 16 includes an upper wall 120 extending between the opposite side members 18 and 20 which supports the upper reach 122 of the belt 22. The top or upper wall 120 has a transverse bar 124 secured to the underside thereof by means of fasteners 125. A rigid flexure bar 126 is secured beneath the bar 124 by fasteners 127 and includes adjustment screws 128 threadedly engaged therein and bearing against the undersurface of the transverse bar 124 to adjustably flex the bar 124 and the upper wall 120 disposed thereabove in order to ensure full contact of the lower cutting edge 130 of the blade 54 with the upper surface of the upper reach 122 of the belt 22.

In operation, the substantially vertical position of the blade 54 illustrated in FIGURES 4 and 5 of the drawings defines a center position of the blade, two limit positions of oscillation of the blade 54 about a horizontal transverse axis being illustrated in FIGURE 7 of the drawings by the two uppermost positions of the blade 54 illustrated in phantom lines. The blade 54 is of course limited in its oscillatory movement by means of the confronting surfaces of the abutments or projections 58 and the corresponding notches 46. The projections or abutments 58 are secured to the undersurfaces of the corresponding end portions 52 of the support arm 50 in any convenient manner and it will be noted that the compression springs 80 and 88 serve to yieldingly urge the blade 54 toward whichever limit position of oscillation the blade is moved past the center position thereof illustrated in FIGURES 4 and 5 of the drawings. Accordingly, inasmuch as the upper end portions 72 of the connecting rods 68 abutting engage the undersurfaces of the end portions 52 of the support arm 50, as the crankshaft is rotated in a counterclockwise direction as viewed in FIGURE 2 of the drawings the lower end of the connecting rod is inclined toward the input end of the roll sheeter 10 which "snaps" the blade 54 to the limit position of oscillation suggested by the second from the top phantom line illustration of the blade 54 in FIGURE 7 of the drawings. The blade 54 then maintains this inclination until such time as the crankpins 66 pass their dead center positions, at which point the lowermost cutting edge 130 of the blade 54 has cut through the dough 138 and is engaged with the upper surface of the reach 122 of the belt 22 whereupon the opposite inclination of the connecting rods 60 causes the blade 54 to "snap" to the opposite inclination of oscillation illustrated in solid lines in FIGURE 7 of the drawings inasmuch as the opposing surfaces of the laterally directed upper end portions 72 of the connecting rods 68 and the opposite end portions 52 of the support arm 50 cause the blade 54 to be returned to and passed beyond its center position of oscillation. Accordingly, it may be seen that the lower end of the blade 54 snaps forwardly while still engaged with the upper surface of the upper reach 122 of the belt 22 and therefore that the portion of the dough 138 disposed forwardly of the blade 54 is pushed forwardly so as to completely separate that forward cut portion of the dough 138 from the remainder of the dough 138. The forward inclination of the blade 54 is then maintained until such time as the crankpins 66 reach and pass their top dead center positions at which point the blade 54 will again be "snapped," by means of the compression springs 80 and 88, to the rearwardly and downwardly inclined position.

Accordingly, it may be seen that the guillotine cutter assembly 28 of the instant invention is constructed in a manner whereby a continuous sheet of dough may be readily cut into longitudinally spaced individual sheets with the individual sheets completely separated from each other in a manner preventing them from adhering to each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a conveyor assembly including a horizontally movable belt reach for conveying dough, a guillotine cutter assembly for cutting and parting dough as it moves along said conveyor assembly on said belt, said guillotine cutter assembly comprising upstanding support means carried by said conveyor assembly, an upstanding cutter blade, mounting means mounting said blade from said support means above said belt for movement in an upstanding plane toward and away from said belt between an upper limit position and a lower limit position, said blade including a lower cutting edge substantially paralleling the plane containing the portion of said belt disposed therebeneath and engageable with said belt when in said lower limit position, drive means operatively connected with said blade and operable to oscillate said blade between said upper and lower limit positions, said mounting means also including means mounting said blade for oscillation about an axis generally paralleling said cutting edge and spaced thereabove between a first position and a second position inclined slightly relative to the first position, said drive means and said mounting means including coacting means defining snap action means operable to snap said blade from said first position to said second position as said blade reaches said lower limit position and to thereafter move said blade from said second position toward said first position prior to the completion of a full cycle of oscillation of said blade and its next downward movement into close proximity with said belt.

2. The combination of claim 1 wherein said upstanding support means comprise a pair of upstanding guide means disposed at opposite sides of said belt, said mounting means including a pair of followers mounted on said guide means for movement therealong, said blade being mounted from said followers for said oscillation and relative to said followers.

3. The combination of claim 2 wherein said mounting means includes means operable to yieldingly urge said blade toward said first and second positions when moved there toward past a center intermediate position, said snap action means including means operable to shift said blade from said second position past said intermediate position when said blade reaches its upper position of travel and to shift said blade from said first position past said intermediate position when said blade reaches its lowermost point.

4. The combination of claim 1 wherein said conveyor assembly includes a back-up member disposed beneath the position of said belt below said blade and extending between opposite side edge portions of said belt, means supporting said back-up member in stationary position relative to said conveyor assembly and for adjustable flexure of said back-up member to conform to the horizontal plane containing the lower cutting edge of said blade.

5. The combination of claim 4 wherein said means supporting said back-up member also includes means mounting said back-up member for vertical adjustment relative to said conveyor assembly.

6. The combination of claim 1 wherein said upstanding support means comprise a pair of upstanding guide means disposed at opposite sides of said belt, said mounting means including a pair of followers mounted on said guide means for movement therealong, said blade being mounted from said followers for said oscillation and relative to said followers, said followers including means defining a pair of upwardly opening recesses, said blade including downwardly projecting abutments above said cutting edge seated in said recesses and oscillatable thereincluding abutment surfaces engageable with each other to define said first and second positions of oscillation of said blade, means connected between said mounting means also including means operable to yieldingly urge said blade toward said first and second positions when moved there toward past a center intermediate position, said snap action means including means operable to shift said blade from said second position past said intermediate position when said blade reaches its upper position of travel and to shift said blade from said first position past said intermediate position when said blade reaches its lowermost point.

7. The combination of claim 6 wherein said recesses are V-shaped and said abutments are also V-shaped, the included angles of said abutments being less than the included angles defined by said recesses whereby said axis about which said blade is oscillatable extends through the apices of said V-shaped recesses and abutments.

8. The combination of claim 7 wherein said means operable to yieldingly urge said blade toward said first and second positions comprises spring means operatively connected between said followers and said blade.

9. The combination of claim 1 wherein said upstanding support means comprise a pair of upstanding guide means disposed at opposite sides of said belt, said mounting means including a pair of followers mounted on said guide means for movement therealong, said blade being mounted from said followers for said oscillation and relative to said followers, said followers including means defining a pair of upwardly opening recesses, said blade including downwardly projecting abutments above said cutting edge seated in said recesses and oscillatable therein about said axis with said recesses and said abutments including abutment surfaces engageable with each other to define said first and second positions of oscillation of said blade, means connected between said mounting means also including means operable to yieldingly urge said blade toward said first and second positions when moved there toward past a center intermediate position, said snap action means including means operable to shift said blade from said second position past said intermediate position when said blade reaches its upper position of travel and to shift said blade from said first position past said intermediate position when said blade reaches its lowermost point, said recesses being V-shaped and said abutments being also V-shaped, the included angles of said abutments being less than the included angles defined by said recesses whereby said axis about which said blade is oscillatable extends through the apices of said V-shaped recesses and abutments, said drive means comprising crank means journalled for rotation about an axis generally paralleling the first mentioned axis and drivingly connected to said blade by means of connecting rod means operatively connected between said crank means and said blade with a limited lost motion connection between said connecting rod means and said blade.

10. The combination of claim 9 wherein said conveyor assembly includes a back-up member disposed beneath the position of said belt below said blade and extending between opposite side edge portions of said belt, means supporting said back-up member in stationary position relative to said conveyor assembly and for angular adjustment relative thereto about an axis generally paralleling said belt reach.

11. The combination of claim 10 wherein said means supporting said back-up member also includes means mounting said back-up member for vertical adjustment relative to said conveyor assembly.

References Cited by the Examiner

UNITED STATES PATENTS

| | | | |
|---|---|---|---|
| 2,478,020 | 8/1949 | Stiles | 83—309 |
| 2,576,533 | 11/1951 | Ott | 83—111 |
| 2,660,133 | 11/1953 | Anetsberger et al. | 83—308 |

WILLIAM W. DYER, Jr., *Primary Examiner.*

J. M. MEISTER, *Assisstant Examiner.*